Aug. 11, 1959     G. M. EDDY     2,898,965
AUXILIARY TREAD FOR DUAL WHEELS
Filed Oct. 3, 1956

INVENTOR.
Glen M. Eddy
BY
Paul E. Mullendore
ATTORNEY

United States Patent Office 2,898,965
Patented Aug. 11, 1959

2,898,965

AUXILIARY TREAD FOR DUAL WHEELS

Glen M. Eddy, Kansas City, Kans.

Application October 3, 1956, Serial No. 613,743

2 Claims. (Cl. 152—175)

This invention relates to an auxiliary tread device for dual wheel vehicles, and has for its principal object to increase the traction of such wheels when operated in mud, snow and ice.

Other objects of the invention are to provide an auxiliary tread device that is easily applied and retained in fixed relation by an annular part which is engaged between the tires of a dual wheel.

It is a further object of the invention to provide an auxiliary tread device for tandem dual wheels, in which instance the auxiliary tread is in the form of an endless belt.

In accomplishing these and other objects of the invention, as hereinafter pointed out, I have provided improved structure, the preferred forms of which are illustrated in the accompanying drawing wherein.

Figure 1:
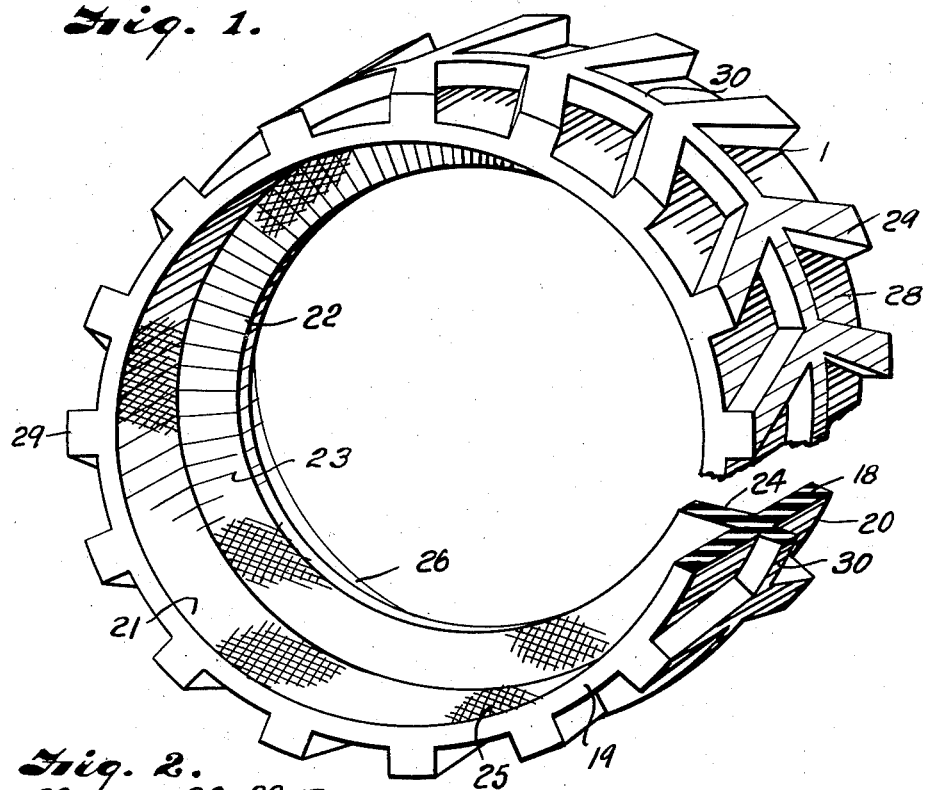
Fig. 1 shows an auxiliary tread device constructed in accordance with the present invention for dual wheels, a portion thereof being broken away and shown in section to better illustrate the form thereof.
Figure 2:
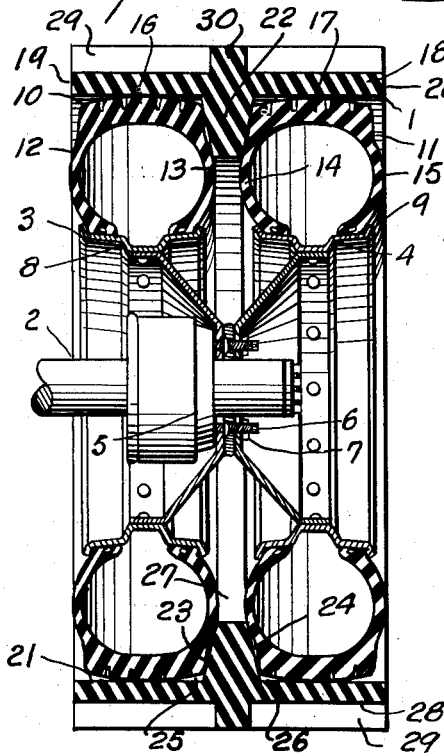
Fig. 2 is a vertical section through the auxiliary tread device and a dual wheel on which the tread device is mounted.

Referring more in detail to the drawings, and first to the form of the invention illustrated in Figs. 1 and 2:

1 designates an auxiliary tread device constructed in accordance with the present invention and 2 designates a dual wheel unit. Dual units of this character include wheels 3 and 4 secured to a single hub assembly 5 by studs 6 and nuts 7, in accordance with the construction of a standard dual wheel. The wheels also include rims 8 and 9 for mounting tires 10 and 11. The tires have side walls 12—13 and 14—15 and tread portions 16 and 17 which ordinarily provide sufficient traction for the vehicle under ordinary conditions. However, when the vehicle is operated in mud, sand, snow, or on icy or wet pavements, the treads do not give sufficient traction for the proper control of the vehicle, and heretofore it has been the practice to provide such wheels with antiskid chains, which are extremely heavy and difficult to apply. They are also subject to rapid wear and may not give the desired traction. Another difficulty is that chains are apt to damage the tires on which they are applied, and at least they shorten the life thereof.

The auxiliary tread device 1 is to overcome these difficulties, the preferred form of which includes a continuous annular band 18 of a width to extend across the treads 16 and 17 of dual wheels with the side faces 19 and 20 thereof adapted to substantially register with the outer side faces 12 and 14 of the tires 10 and 11 of the dual wheels 3 and 4, as later described. The inner annular face 21 of the band 18 is of a circumference to encircle closely the treads 16 and 17 of the tires. The band 18 is provided intermediate the width thereof with an internal continuous annularly extending rib 22 having inwardly tapering sides 23 and 24. The rib 22 thus divides the inner peripheral face 21 into spaced apart inner circumferential faces on the respective sides of the rib to cooperate with the tapering side faces of the rib to form recesses 25 and 26 adapted to contain the tires 10 and 11, with the rib 22 engaging in the space or groove 27 between the adjacent walls 13 and 14 of the tires. The exterior or outer circumferential face 28 of the band 18 is provided with traction lugs 29 of any suitable form to provide traction surface across the entire width of the wheels. In the illustrated instance, the cleats 29 are of spaced apart chevron form to give traction in a straightaway or reverse direction, and are connected by an annular rib 30 extending about the band to prevent sidewise slipping.

With the present invention, the band 18 is made of resilient material, such as rubber preferably reinforced with cords, fabric, and like reinforcements, in the manner of ordinary tire construction. The cleats are preferably integral with the band and in sufficient number and depth to provide highly efficient and serviceable traction under adverse conditions. The annular face 21 and/or the side faces of the rib 22 may be tractionized to prevent slipping of the band on the tires. This tractionizing may be provided by roughening the face 21 and/or side faces of the rib 22 or by providing these faces with slight projections.

In applying the auxiliary traction device to the wheels, the wheels are raised from the ground a sufficient distance to permit removal of the outside wheel 4 and to provide space under the inner wheel 3 for sliding the auxiliary tread over the tread of the tire 10. In applying the auxiliary tread member, it is brought into coaxial alignment with the hub 5 and the band 18 thereof is moved over the tread of the tire 10 to bring the side 23 of the rib 22 into abutting contact with the side wall 13 of the tire 10. The tire and wheel 3 are then completely contained in the recess 25. The outer wheel 11 which has been removed is then moved into position and pushed into the recess 26 at the opposite side of the rib 22 until the inner side 14 of the wheel 4 abuts the outer side 24 of the rib 22, in which position the tread 17 of the wheel 4 is closely engaging the face 21 of the rib 22. The nuts 7 are then applied to the studs 6 and tightened thereon to draw the outer wheel 4 into position on the hub assembly 5. The rib 22 is then gripped between the adjacent side walls 13 and 14 of the tires, as shown in Fig. 2, to complete the attachment of the auxiliary tread device 1. When the dual wheel is lowered for contact with the ground, the lugs 29 on the auxiliary tread make contact with the ground, and since they extend across both of the wheels, including the space therebetween, they provide an extended contact and depth to provide the traction which is most desirable. Since the tires 10 and 11 firmly grip the auxiliary tread member under action of the air with which the tires are inflated, the tread turns with the wheels under power of the engine of the vehicle.

When desired, the auxiliary tread device may be readily removed. The wheel is raised from the ground to remove the outer wheel 4, after which the auxiliary tread device 1 is withdrawn from the inner wheel 3 by sliding it therefrom. The outer wheel 4 is then reapplied.

Another advantage of the invention is that the auxiliary tread device provides the desired traction without injury to paving and without digging holes in an attempt to gain traction to keep the vehicle in motion.

Figure 3:
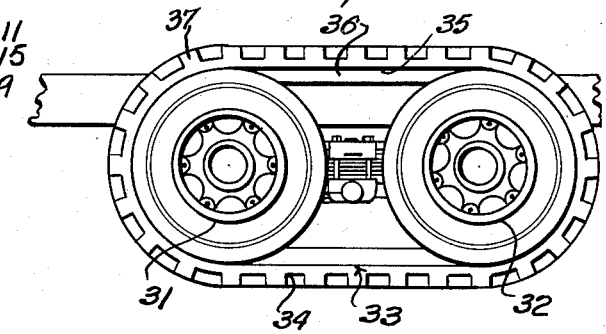
Fig. 3 is a side elevational view of a modified form of auxiliary tread especially adapted for use on tandem dual wheels.

In Fig. 3 is shown tandem dual wheel assemblies 31 and 32, wherein the auxiliary traction device 33 includes an endless band 34 having substantially the same cross sectional shape as the band 18 of the single dual wheel member 1. The band is of a length to extend over both front and rear wheel assemblies 31 and 32. The inner face 35 of the band has a central inwardly extending rib 36 that is adapted to engage in the spaces between the pneumatic tires of the dual wheels of the front and rear assemblies so that when the wheels are operated the auxiliary band is driven under power to provide the necessary traction when the vehicle is operated under adverse road conditions. In this instance the band is sufficiently loose to operate as a caterpillar tread, but the inner rib 36 operating in the space between the sides of the tires keeps the tread in alignment with the wheels. The traction lugs 37 on the outer face of the band 34 may be in the form shown in Fig. 1 or other suitable design to provide the desired traction.

From the foregoing it is obvious that I have provided an auxiliary tread member for dual wheeled vehicles that is readily applied to such wheels and retained in position thereon. In the form of the invention illustrated in Fig. 1, the wheels fit snugly and grip the rib under resiliency of the tires. In the form illustrated in Fig. 3, the band has freedom of movement on the wheels, however, the band is retained in position by operation of the rib within the space between the tires of the front and rear dual wheel assemblies.

What I claim and desire to secure by Letters Patent is:

1. An auxiliary tread device for dual wheels of a type having inner and outer wheels removably secured to a common hub by fastening means and carrying inner and outer pneumatic tires having annular treads and adjacent side faces of the respective tires spaced apart for providing an annular groove between said tires, said auxiliary tread device comprising a continuous annular band composed of resilient material having the characteristics of the material of the tires and having spaced apart inner circumferential faces and a continuous annular rib projecting inwardly intermediate said faces and having side faces cooperating with said inner circumferential faces of the tread device to provide a recess on one side of the rib adapted to receive therein the inner of said tires with the annular face on that side of the rib engaging the tread of the inner tire when the tread device is slid axially over the tread of the inner tire for bringing the annular rib into abutment with the outer face of the inner tire and to provide a recess on the other side of the rib to accommodate therein the outer of said tires when the outer wheel is applied to said hub for bringing the inner face of the outer tire into abutment with the outer face of the rib, said rib being adapted to be gripped between said tires upon application of the fastening device which retains the outer of said wheels for preventing the tread device from shifting laterally on said treads.

2. An auxiliary tread device for dual wheels of a type having inner and outer wheels removably secured to a common hub by fastening means and carrying inner and outer pneumatic tires having annular treads and adjacent side faces of the respective tires spaced apart for providing an annular groove between said tires, said auxiliary tread device comprising a continuous annular band composed of resilient material having the characteristics of the material of the tires and having spaced apart inner circumferential faces and a continuous annular rib projecting inwardly intermediate said faces and having inwardly tapering side faces cooperating with said inner circumferential faces of the tread device to provide a recess on one side of the rib adapted to receive therein the inner of said tires with the annular face on that side of the rib engaging the tread of the inner tire when the tread device is slid axially over the tread of the inner tire for bringing one tapered side face of the annular rib into abutment with the outer face of the inner tire and to provide a recess on the other side of the rib to accommodate therein the outer of said tires when the outer wheel is applied to said hub for bringing the inner face of the outer tire into abutment with the outer of said tapered faces of the rib, said rib being adapted to be gripped between said tires upon application of the fastening device which retains the outer of said wheels for preventing the tread device from shifting laterally on said treads.

References Cited in the file of this patent

UNITED STATES PATENTS

| | | |
|---|---|---|
| 1,935,950 | Lawrence | Nov. 21, 1933 |
| 2,365,279 | Kraft | Dec. 19, 1944 |
| 2,374,355 | Kennedy | Apr. 24, 1945 |
| 2,441,471 | Chausse | May 11, 1948 |
| 2,696,237 | Doughty | Dec. 7, 1954 |
| 2,753,912 | Mallow | July 10, 1956 |

FOREIGN PATENTS

| | | |
|---|---|---|
| 342,070 | France | June 28, 1906 |
| 450,176 | France | Jan. 13, 1913 |